United States Patent [19]

Ikeno

[11] Patent Number: 5,334,687

[45] Date of Patent: Aug. 2, 1994

[54] ORGANOPOLYSILOXANE COMPOSITION

[75] Inventor: Masayuki Ikeno, Annaka, Japan

[73] Assignee: Shin-Etsu Chemical Co., Ltd., Tokyo, Japan

[21] Appl. No.: 32,202

[22] Filed: Mar. 15, 1993

Related U.S. Application Data

[63] Continuation-in-part of Ser. No. 955,228, Oct. 1, 1992, abandoned, which is a continuation of Ser. No. 578,444, Sep. 7, 1990, abandoned.

[30] Foreign Application Priority Data

Sep. 8, 1989 [JP] Japan .................... 1-233398

[51] Int. Cl.$^5$ .............................. C08G 77/06
[52] U.S. Cl. ........................ 528/15; 528/20; 528/21
[58] Field of Search ................. 528/15, 21, 20

[56] References Cited

U.S. PATENT DOCUMENTS

| | | | |
|---|---|---|---|
| 3,445,420 | 5/1969 | Kookootsedes et al. | 525/478 |
| 4,530,879 | 7/1985 | Drahnak | 528/15 |
| 4,584,361 | 4/1986 | Janik et al. | 525/478 |
| 5,006,372 | 4/1991 | Wolfer et al. | 528/15 |

Primary Examiner—Melvyn I. Marquis
Attorney, Agent, or Firm—Oblon, Spivak, McClelland, Maier & Neustadt

[57] ABSTRACT

An addition-curing type organopolysiloxane composition comprising, in addition to an alkenyl-containing organopolysiloxane and an organohydrogenpolysiloxane, an amine compound represented by the general formula:

$$(R^2)_2N-R^4-N(R^3)_2$$

wherein $R^2$ is an alkyl radical of from 1 to 4 carbon atoms, $R^3$ is an alkyl radical of from 1 to 4 carbon atoms or a hydrogen atom, and $R^4$ is an alkylene radical of from 2 to 4 carbon atoms, or an amine compound represented by the general formula:

$$R^5-NH_2$$

wherein $R^5$ is an alkyl radical of from 2 to 4 carbon atoms, and acetylene alcohol. The composition has excellent long-time shelf stability at room temperature and, when heated, rapidly cures to yield a gel form or elastomer form cured product.

10 Claims, No Drawings

ORGANOPOLYSILOXANE COMPOSITION

This application is a continuation-in-part of application Ser. No. 07/955,228 filed Oct. 1, 1992, now abandoned, which is a continuation of application Ser. No. 07/578,444 filed Sep. 7, 1990, now abandoned.

BACKGROUND OF THE INVENTION

1. Field of the Invention

This invention relates to an addition-curing type organopolysiloxane composition, and more particularly to an organopolysiloxane composition which has good long-time shelf stability at room temperature.

2. Description of the Prior Art

Heretofore, there are known curable organopolysiloxane compositions which contain an organohydrogenpolysiloxane having a silicon-bonded hydrogen atom ($\equiv$Si—H) and an organopolysiloxane having a silicon-bonded aliphatic hydrocarbon radical, for example, vinyl radical ($\equiv$Si—CH=CH$_2$) and which utilize the addition of the $\equiv$Si—H bond to the vinyl radical or the like (i.e., hydrosilylation). Also, there have been proposed organopolysiloxane compositions which are obtained by admixing the curable organopolysiloxane composition of the above-mentioned type with an inhibitor to inhibit the curing reaction at or around room temperature, thereby enhancing the long-time shelf stability, and which can be cured through acceleration of the hydrosilylation by heating at the time of use thereof. For instance, such organopolysiloxane compositions have been proposed which contain, as the inhibitor, an acetylene compound (U.S. Pat. No. 3,445,420), a sulfoxide compound (U.S. Pat. No. 3,453,234) or a hydroperoxide compound (U.S. Pat. No. 4,061,609). However, where an organopolysiloxane composition contains an organohydrogenpolysiloxane having (H)(R')$_2$SiO$_{0.5}$ units wherein the two R' radicals are identical or different univalent hydrocarbon radicals, it is impossible, even by the addition of the above-mentioned inhibitor, to achieve effective inhibition of the curing due to hydrosilylation of the hydrogen atoms in the (H)(R')(—R')$_2$SiO$_{0.5}$ unit and the silicon-bonded aliphatic hydrocarbon radical at a temperature around room temperature. Therefore, such an organopolysiloxane composition has unsatisfactory shelf stability.

It has been proposed to use an amine compound such as n-butylamine, N,N-dibutylaminopropylamine, N,N,N',N'-tetramethylethylenediamine, etc., as an inhibitor for inhibiting the hydrosilylation of a silicon-bonded hydrogen atom located at a terminal of an organohydrogenpolysiloxane and a silicon-bonded aliphatic hydrocarbon radical in an organopolysiloxane at temperatures around room temperature (See U.S. Pat. No. 4,584,361). However, when the amine compound as mentioned above is added to an organopolysiloxane composition containing an organohydrogenpolysiloxane having the (H)(R')$_2$SiO$_{0.5}$ unit, the resultant composition is still unsatisfactory in shelf stability and would show poor curing properties when cured after stored for a long time at room temperature.

SUMMARY OF THE INVENTION

It is accordingly an object of this invention to provide an organopolysiloxane composition having excellent long-time shelf stability, free of possibility of unsatisfactory cure even after long-time storage at room temperature, and capable of quick curing by heating.

It has been found, as a result of the present inventors' studies for attaining the above-mentioned object, that it is possible to overcome the above disadvantages in the prior art by combined use of a particular amine compound and acetylene alcohol as the inhibitor, which has led to the present invention.

According to this invention, there is provided an organopolysiloxane composition which comprises:

(A) an organopolysiloxane having alkenyl radicals which comprises at least 0.05 mol % on average of all the silicon-bonded organic radicals contained in the molecule;

(B) an organohydrogenpolysiloxane containing at least two siloxy units represented by the formula (I):

wherein the two R$^1$ radicals, which may be identical or different, are each a univalent hydrocarbon radical of from 1 to 10 carbon atoms selected from the group consisting of alkyl radicals, cycloalkyl radicals, aryl radicals and aralkyl radicals which may be substituted, per molecule;

(C) a platinum group metal catalyst;

(D) at least one amine compound selected from the group consisting of the compounds represented by the general formula (II):

wherein R$^2$ is an alkyl radical of from 1 to 4 carbon atoms, the two R$^2$ radicals being either identical or different, R$^3$ is an alkyl radical of from 1 to 4 carbon atoms or a hydrogen atom, the two R$^3$ radicals being either identical or different, and R$^4$ is an alkylene radical of from 2 to 4 carbon atoms, and the compounds represented by the general formula (III):

wherein R$^5$ is an alkyl radical of from 2 to 4 carbon atoms; and (E) an acetylene alcohol.

The organopolysiloxane composition of this invention has excellent long-time shelf stability, shows good stability event when stored for a long time at room temperature, and is capable of being cured quickly by heating. The composition of this invention is thus of great practical value.

DETAILED DESCRIPTION OF THE INVENTION

Component (A)

In the composition of this invention, the organopolysiloxane used as component (A) is an organopolysiloxane in which at least 0.05 mol %, preferably from 0.1 to 2 mol %, of all the silicon-bonded organic radicals contained in the molecule thereof are alkenyl. If the alkenyl content is less than 0.05 mol %, the resultant composition is difficult to cure sufficiently, and it may be impossible to obtain a cured product in the gel form or elastomer form.

The alkenyl radicals are preferably alkenyl radicals of from 2 to 8 carbon atoms, for example, vinyl, allyl, 1-butenyl, 1-hexenyl, etc. The alkenyl radicals may each be bonded to either of silicone atoms located within the molecular chain or at a terminal of the molecular chain of the organopolysiloxane. From the viewpoint of cure rate of the composition obtained, however, it is preferable that the alkenyl radicals are each bonded to the terminal silicon atom in the molecular chain.

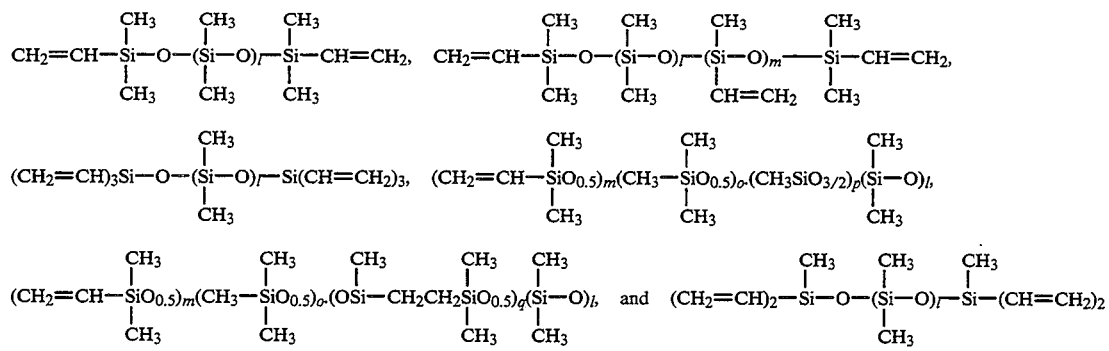

Such an organopolysiloxane may, for example, be represented by the following average composition formula (IV):

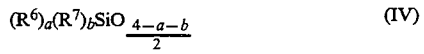  (IV)

wherein $R^6$ is an alkenyl radical as described above, $R^7$ is a univalent hydrocarbon radical of from 1 to 10 carbon atoms selected from the group consisting of alkyl radicals, cycloalkyl radicals, aryl radicals and aralkyl radicals which may be substituted, with the proviso that two $R^7$ radicals may be linked to each other to form a lower alkylene radical, a is a number in the range of $0<a<3$, and b is a number in the range of $0<b<3$, provided $0<a+b<4$.

The structure of the organopolysiloxane may be a linear, cyclic or branched organopolysiloxane, or a mixture thereof.

Examples of the univalent hydrocarbon radical $R^7$ of from 1 to 10 carbon atoms in the average composition formula (IV) include alkyl radicals such as methyl, ethyl, propyl, isopropyl, butyl, octyl, etc.; cycloalkyl radicals such as cyclopentyl, cyclohexyl, cyclobutyl, etc.; aryl radicals such as phenyl, tolyl, xylyl, naphthyl, etc.; aralkyl radicals such as benzyl, phenylethyl, phenylpropyl, etc.; radicals corresponding to these hydrocarbon radicals in which some or all of the carbon-bonded hydrogen atoms are substituted by chlorine, fluorine, bromine or other halogen atoms, cyano radicals or the like, for instance, halogenated hydrocarbon radicals such as chloromethyl, trifluoropropyl, chlorophenyl, dibromophenyl, tetrachlorophenyl, difluorophenyl, etc.; cyanoalkyl radicals such as β-cyanoethyl, γ-cyanopropyl, β-cyanopropyl, etc.

Besides, two $R^7$ hydrocarbon radicals may be linked to each other to form a lower alkylene radical. Examples of the lower alkylene radical formed in this manner include ethylene, trimethylene, methylmethylene, tetramethylene, hexamethylene radicals, etc.

At least one such organopolysiloxane represented by the average composition formula (IV) is used either singly or in combination of two or more.

It is generally preferable that the viscosity of the organopolysiloxane used as component (A) is in the range from 50 to 100,000 cP at 25° C. in order that the composition obtained shows appropriate fluidity before curing and exhibits stable physical properties after cure in used of the composition for casting, potting, coating, impregnation, adhesion or the like.

Specific examples of the organopolysiloxane for used as component (A) include the organopolysiloxanes represented by the following formulas:

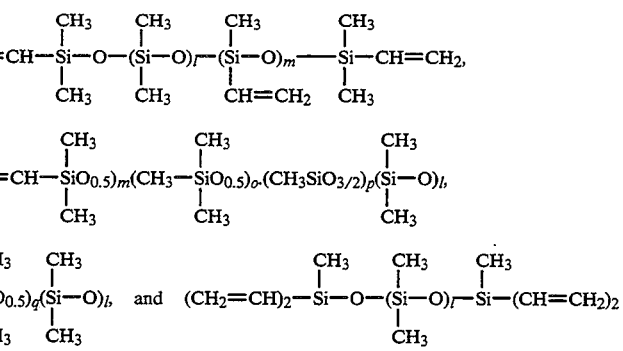

wherein l, m, o, p and q are each a positive integer.

Component (B)

The organohydrogenpolysiloxane used as component (B) of the composition according to this invention is an organohydrogenpolysiloxane having at least two siloxy units represented by the formula (I):

$$\begin{array}{c} R^1 \\ | \\ H-SiO_{0.5} \\ | \\ R^1 \end{array} \quad (I)$$

wherein $R^1$ is as defined above. The silicon-bonded hydrogen atoms in the siloxy units are brought into an addition reaction with the alkenyl radicals contained in the organopolysiloxane of the above-mentioned component (A), to yield a cured product.

Examples of the substituted or unsubstituted univalent hydrocarbon radical $R^1$ of from 1 to 10 carbon atoms, in the formula (I), include those radicals described above as examples of the radical $R^7$ in the formula (IV).

The organohydrogenpolysiloxanes above include, for example, linear, cyclic, branched or network organohydrogenpolysiloxanes represented by the following average composition formula (V):

  (V)

wherein $R^1$ is as defined above, c is a number in the range of $0<c\leq 2$, d is a number in the range of $0<d\leq 3$, provided $0<c+d<4$.

In the organohydrogenpolysiloxane represented by the average composition formula (V), two $R^1$ radicals may be linked to each other to form a lower alkylene radical, in so far as the organohydrogenpolysiloxane contains the siloxy units of the above-mentioned formula (I). Further, the plurality of $R^1$ radicals may be different from each other.

Linear type examples of the organohydrogenpolysiloxane of component (B) include organohydrogenpolysiloxanes represented by the following general formula (VI):

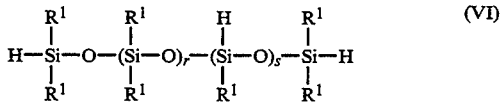

wherein $R^1$ is as defined above, r is a positive integer, and s is 0 or a positive integer.

On the other hand, branched type examples of the organohydrogenpolysiloxane of component (B) include organohydrogenpolysiloxanes which have an $R^1SiO_{3/2}$ unit, $SiO_2$ unit,

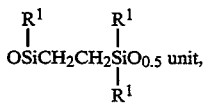

wherein $R^1$ is as defined above, or the like at which the molecular chain is branched.

In this invention, the organohydrogenpolysiloxanes as described above may be used either singly or in combination of two or more. The organohydrogenpolysiloxane which has a viscosity of not more than 1,000 cP at 25° C. is preferably used, in view of easiness of synthesis.

In general, the component (B) of the composition of this invention is preferably used in such an amount that the ratio of the number of the silicon-bonded hydrogen atoms contained in the molecule of the component (B) to the number of the alkenyl radicals in the organopolysiloxane of component (A) is from 0.5 to 4.0, more preferably from 0.8 to 1.5. When the component (B) is used in such an amount, the resultant composition does not show foaming at the time of curing and, after cured, is excellent in physical properties such as heat resistance, mechanical strength, etc.

Component (C)

The platinum group metal catalyst of component (C) in this invention is used for accelerating the addition reaction of the above-mentioned alkenyl radicals with the silicon-bonded hydrogen atoms. The platinum group metal catalysts which are usable here include platinum catalysts, rhodium catalysts, palladium catalysts, etc., of which preferred are platinum catalysts such as platinum, chloroplatinic acid, platinum-olefin complexes, platinum-alcohol complexes, coordination compounds of platinum, etc.

Generally, the amount of the component (C), in terms of platinum group metal, in the composition of this invention is preferably at least 1 ppm, particularly from 3 to 100 ppm, based on the component (A) inasmuch as the resulting composition has good curability.

Component (D)

The amine compound as component (D) of the composition of this invention is at least one compound selected from the group consisting of the compounds represented by the formula (II) or (III):

wherein $R^2$, $R^3$ and $R^4$ are as defined above.

wherein $R^5$ is as defined above.

Use of the amine compound in combination with the acetylene alcohol of component (E) described later, enhances markedly the shelf stability of the composition.

In the formula (II) above, $R^2$ is an alkyl radical of from 1 to 4 carbon atoms, for example, methyl, ethyl, propyl, butyl, etc., and the two $R^2$ radicals may be identical or different. $R^3$ is an alkyl radical of from 1 to 4 carbon atoms, similar to the above, or a hydrogen atom, and the two $R^3$ radicals may be identical or different. The radical $R^3$ is preferably the same radical as $R^2$ or the hydrogen atom. $R^4$ is an alkylene radical of from 2 to 4 carbon atoms, such as ethylene, methylethylene, ethylmethylene, ethylethylene, trimethylene, tetramethylene, etc. Examples of the amine compound represented by the formula (II) include N,N,N'N'-tetramethylethylenediamine, N,N-dimethylethylenediamine, N,N-diethylethylenediamine, N,N-dibutylethylenediamine, N,N-dibutyl-1,3-propanediamine, N,N-dimethyl-1,3-propanediamine, N,N,N'N'-tetraethylethylenediamine, N,N-dibutyl-1,4-butanediamine, etc.

In the formula (III) above, $R^5$ is an alkyl radical of from 2 to 5 carbon atoms such as ethyl, n-propyl, isopropyl, n-butyl, iso-butyl, tert-butyl, heptyl, etc. Examples of the amine compound of the formula (III) include ethylamine, propylamine, butylamine, heptylamine, etc., of which n-butylamine is particularly preferred.

In this invention, the amine compounds as described above may be used either singly or in combination of two or more. The amine compounds of the formula (II) are preferred, and N,N,N',N'-tetramethylethylenediamine is the most preferred.

It is generally preferable to use the component (D) in the composition of this invention in an amount of at least 1 mole, more preferably from 2 to 20 moles, per mole of the platinum group metal atom in the platinum group metal catalyst of component (C). Because, according to such amounts, the catalytic action of component (C) is controlled to a suitable extent, and the resulting composition has good long-time shelf stability; thus the composition is not cured during storage but exhibits good curability when cured.

Component (E)

The acetylene alcohol as component (E) of the composition of this invention is an unsaturated alcohol having an acetylene linkage in its molecule, and may be exemplified by those described in U.S. Pat. No. 3,445,420.

The acetylene alcohols which can be used preferably in this invention include, for example, 3-methyl-1-butyn-3-ol, 3-phenyl-1-butyn-3-ol, 1-ethynyl-1-cyclohexanol, 3,5-dimethyl-1-hexyn-3-ol, 3-methyl-1-pentyn-3-ol, etc.

Generally, the component (E) in the composition of this invention is preferably used in an amount of at least 10 moles, particularly from 50 to 400 moles, per mole of the platinum group metal atoms in the platinum group metal catalyst of component (C), from the viewpoints of the curing rate, shelf stability, etc., of the composition obtained. Further, the component (E) is used in an amount such that the molar ratio of the component (E)/the component (D) is preferably in the range from 2 to 200, more preferably from 10 to 100.

Other Components

In addition to the components (A), (B), (C), (D) and (E) as described above, the composition of this invention may further comprises an organohydrogenpolysiloxane containing only one dimethylhydrogensiloxy unit $(CH_3)_2(H)SiO_{0.5}$ or an organohydrogenpolysiloxane containing only one methylhydrogensiloxane unit $(CH_3)(H)SiO$ or an organohydrogenpolysiloxane which does not contain the siloxy unit of the above-mentioned formula (I) at the end of its molecular chain, in such appropriate amounts not as to impair the effects of this invention.

Furthermore, a silicone oil such as dimethylpolysiloxane, or silicone gum or the like may be incorporated into the composition of this invention in order to control or modify the flowing properties or the composition, hardness of the cured product of the composition, etc. Also, inorganic filler may be added to the composition to control the mechanical strength according to the intended use of the composition. The inorganic fillers which can be used include, for example, fumed silica, silica aerogel, precipitated silica, pulverized lime, diatomaceous earth, iron oxide, zinc oxide, titanium oxide, calcium carbonate, magnesium carbonate, zinc carbonate, alumina, aluminum nitride, boron nitride, silver powder, carbon black, graphite, glassy carbon, etc. Various dyes such as anthraquinone dyes, azo dyes, etc., may be also incorporated into the composition of this invention, for coloring or other purposes.

Organopolysiloxane Composition

The organopolysiloxane composition of this invention can be prepared easily by blending uniformly the above-mentioned components.

The composition is excellent in long-time shelf stability at room temperature, as will be demonstrated by the examples below. In addition, the composition is cured easily by heating treatment carried out at a temperature of usually 100° C. or above, preferably from 130° to 150° C. for a period of from about 10 to 30 minutes, to yield a gel form or elastomer form cured product.

EXAMPLES

This invention will be described in more detail below referring to non-liminative examples and comparative examples. In the following description, the term "parts" means "parts by weight".

EXAMPLE 1

Fifty parts of an organopolysiloxane containing 95 mol % of the dimethylsiloxane unit $[(CH_3)_2SiO]$, 0.7 mol % of the dimethylvinylsiloxy unit $[(CH_2=CH)(CH_3)_2SiO_{0.5}]$, 1.3 mol % of the trimethylsiloxy unit $[(CH_3)_3SiO_{0.5}]$ and 3 mol % of the monomethylsiloxane unit $[CH_3SiO_{1.5}]$ and having a viscosity of 1,000 cP at 25° C., parts of an organopolysiloxane containing 94.5 mol % of the dimethylsiloxane unit $[(CH_3)_2SiO]$, 2.5 mol % of the trimethylsiloxy unit $[(CH_3)_3SiO_{0.5}]$ and 3 mol % of the monomethylsiloxane unit $[CH_3SiO_{1.5}]$ and having a viscosity of 800 cP at 25° C. 5.5 parts of a dimethylpolysiloxane endblocked by the dimethylhydrogensiloxy unit $[(H)(CH_3)_2SiO_{0.5}]$ and having a silicon-bonded hydrogen atom content of about 0.068% by weight, 0.05 part of a chloroplatinic acid-vinylsiloxane complex (platinum content: 1% by weight), 0.0006 part of tetramethylethylenediamine, and 0.003 part of 1-ethynyl-1-cyclohexanol were mixed uniformly to give a composition.

The composition is cured by heating at 150° C. for 60 minutes, to obtain a transparent gel form matter. The penetration of the gel form matter was measured by a penetrometer with $\frac{1}{4}$ scale. The curing properties at 120° C. of the composition immediately after blending and the curing properties of the composition a 6-month storage at room temperature after blending were measured by the following method, and the shelf stability of the composition was evaluated. The results are shown in Table 1.

Curing Properties

Torque was measured by use of a rheopexy analyzer (Model RPX-705, made by Iwamoto Seisakusho K.K.) under the conditions of a temperature of 120° C., a swing angle of 4°, a frequency of 0.1 Hz and a sweet time of 30 min. The torque measured after the sweet time of 30 min was taken as the maximum (full torque), and the period of time ($T_{90}$) from the start of curing to the time the torque reached 90% of the full torque was measured. The measured $T_{90}$ was adopted as an index of curing properties.

The curing properties of the composition stored at room temperature for six months after blending ($T_{90'}$) was also measured.

Shelf Stability

The composition was stored at room temperature for 6 months after blending, and the increase in the viscosity of the composition was examined.

EXAMPLE 2

A composition was obtained in the same manner as in Example 1 except that the amount of 1-ethynyl-1-cyclohexanol was changed to 0.03 part.

The penetration of the composition obtained, the curing properties ($T_{90}$) at 120° C. of the composition immediately after blending, and the curing properties ($T_{90'}$) of the composition stored at room temperature for six months after blending were measured, and the shelf stability of the composition was evaluated. The results are shown in Table 1.

EXAMPLE 3

A composition was obtained in the same manner as in Example 1 except that the amount of 1-ethynyl-1-cyclohexanol was changed to 0.06 part.

The penetration of the composition obtained, the curing properties ($T_{90}$) at 120° C. of the composition immediately after blending, and the outing properties ($T_{90'}$) of the composition stored at room temperature for six months after blending were measured, and the shelf stability of the composition was evaluated. The results are shown in Table 1.

EXAMPLE 4

A composition was obtained in the same manner as in Example 1 except that 0.02 part of 3-methyl-1-butyn-3-ol was used in place of 1-ethynyl-1-cyclohexanol.

The penetration of the composition obtained, the curing properties ($T_{90}$) at 120° C. of the composition immediately after blending, and the curing properties ($T_{90'}$) of the composition stored at room temperature for six months after blending were measured, and the shelf stability of the composition was evaluated. The results are shown in Table 1.

EXAMPLE 5

A composition was obtained in the same manner as in Example 1 except that 0.0038 part of n-butylamine was used in place of tetramethylethylenediamine.

The penetration of the composition obtained, the curing properties ($T_{90}$) at 120° C. of the composition immediately after blending, and the curing properties ($T_{90'}$) of the composition stored at room temperature for one month after blending were measured, and the shelf stability of the composition was evaluated. The results are shown in Table 1.

COMPARATIVE EXAMPLE 1

A composition was obtained in the same manner as in Example 1 except that 1-ethynyl-1-cyclohexanol was not used.

The penetration of the composition obtained, the curing properties ($T_{90}$) at 120° C. of the composition immediately after blending, and the curing properties ($T_{90'}$) of the composition stored at room temperature for six months after blending were measured, and the shelf stability of the composition was evaluated. The results are shown in Table 1.

COMPARATIVE EXAMPLE 2

A composition was obtained in the same manner as in Example 1 except that tetramethylethylenediamine was not used, and the amount of 1-ethynyl-1-cyclohexanol was changed to 0.03 part.

The penetration of the composition obtained, the curing properties ($T_{90}$) at 120° C. of the composition immediately after blending, and the curing properties ($T_{90'}$) of the composition stored at room temperature for six months after blending were measured, and the shelf stability of the composition was evaluated. The results are shown in Table 1.

COMPARATIVE EXAMPLE 3

A composition was obtained in the same manner as in Example 5 except that no 1-ethynyl-1-cyclohexanol was used.

The penetration of the composition obtained, the curing properties ($T_{90}$) at 120° C. of the composition immediately after blending, and the curing properties ($T_{90'}$) of the composition stored at room temperature for one month after blending were measured, and the shelf stability of the composition was evaluated. The results are shown in Table 1.

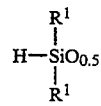

wherein the two $R^1$ radicals, which may be identical or different, are each a univalent hydrocarbon radical of from 1 to 10 carbon atoms selected from the group consisting of alkyl radicals, cycloalkyl radicals, aryl radicals and aralkyl radicals which may be substituted, per molecule;

(C) a platinum group metal catalyst;

(D) at least one amine compound selected from the group consisting of the compounds represented by the general formula (II):

wherein $R^2$ is an alkyl radical of from 1 to 4 carbon atoms, the two $R^2$ radicals being either identical or different, $R^3$ is an alkyl radical of from 1 to 4 carbon atoms or a hydrogen atom, the two $R^3$ radicals being either identical or different, and $R^4$ is an alkylene radical of from 2 to 4 carbon atoms, and the compounds represented by the general formula (III):

wherein $R^5$ is an alkyl radical of from 2 to 4 carbon atoms; and (E) an acetylene alcohol, with the mole ratio of acetylene alcohol to Pt group metal atoms in the catalyst at least 10 and with the mole ratio of amine compound (D) to Pt group metal atoms in the catalyst ranging from 2 to 20:1.

2. The organopolysiloxane composition according to claim 1, wherein the organohydrogenpolysiloxane of (B) is present in such an amount that the ratio of the number of the silicon-bonded hydrogen atoms contained in its molecule to the number of the alkenyl radicals of the organopolysiloxane of (A) is from 0.5 to 4.0.

3. The organopolysiloxane composition according to claim 1, wherein the platinum group metal catalyst of (C) is present in amount of at least 1 ppm in terms of platinum group metal based on the organopolysiloxane of (A).

TABLE 1

|  | Amine compound/ Platinum atoms (molar ratio) | Acetylene alcohol Platinum atoms (molar ratio) | Penetration | Shelf stability (after 6 months at room temp.) | Curing properties $T_{90}$*1 | $T_{90'}$*2 |
|---|---|---|---|---|---|---|
| Example |  |  |  |  |  |  |
| 1 | 2 | 10 | 73 | No thickening | 3.4 | 13 |
| 2 | 2 | 100 | 80 | No thickening | 2.5 | 3.3 |
| 3 | 2 | 200 | 90 | No thickening | 3.5 | 4.5 |
| 4 | 2 | 100 | 80 | No thickening | 3.0 | 4.3 |
| 5 | 20 | 200 | 90 | No thickening | 13 | 20 |
| Comparative Example |  |  |  |  |  |  |
| 1 | 2 | — | 73 | No thickening | 3.7 | 20 |
| 2 | — | 100 | 80 | Gelled after one day | 2 | — |
| 3 | 20 | — | 87 | No thickening | 15 | Not cured |

Remarks
*1$T_{90}$: immediately after blending.
*2$T_{90'}$: after 6 months at room temperature

We claim:

1. An organopolysiloxane composition which comprises:

(A) an organopolysiloxane having alkenyl radicals which comprises at least 0.05 mol % on average of all the silicon-bonded organic radicals contained in the molecule;

(B) an organohydrogenpolysiloxane containing at least two siloxy units represented by the formula (I):

4. The organopolysiloxane composition according to claim 1, comprising the compound of formula (II) as the amine compound (D).

5. The organopolysiloxane composition according to claim 4, said amine compound of (D) is at least one compound selected from the group consisting of N,N,N',N'-tetramethylethylenediamine, N,N-dimethylethylenediamine, N,N-diethylethylenediamine, N,N-dibutylethylenediamine, N,N-dibutyl-1,3-propanediamine, N,N-dimethyl-1,3-propanediamine, N,N,N'N'-tetraethylethylenediamine and N,N-dibutyl-1,4-butanediamine.

6. The organopolysiloxane composition according to claim 5, comprising N,N,N'N'-tetramethylethylenediamine as the amine compound (D).

7. The organopolysiloxane composition according to claim 1, wherein the amine compound of (D) is present in an amount of at least one mole per mole of the platinum group metal atoms of the platinum group metal catalyst of (C).

8. The organopolysiloxane composition according to claim 1, wherein the amine compound of (D) is present in an amount of from 2 to 20 moles per mole of the platinum group metal atoms of the platinum group metal catalyst of (C).

9. The organopolysiloxane composition according to claim 1, said acetylene alcohol of (E) is at least one compound selected from the group consisting of 3-methyl-1-butyn-3-ol, 3-phenyl-1-butyn-3-ol, 1-ethynyl-1-cyclohexanol, 3,5-dimethyl-1-hexyn-3-ol, and 3-methyl-1-pentyn-3-ol.

10. The organopolysiloxane composition according to claim 1, wherein the mole ratio of acetylene alcohol (E) to amine compound (D) ranges from 2-200:1.

* * * * *